United States Patent
Okada

(10) Patent No.: US 10,757,381 B2
(45) Date of Patent: Aug. 25, 2020

(54) IMAGE PROJECTION APPARATUS AND ITS CONTROL METHOD

(71) Applicant: CANON KABUSHIKI KAISHA, Tokyo (JP)

(72) Inventor: Yoshiyuki Okada, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/427,547

(22) Filed: May 31, 2019

(65) Prior Publication Data

US 2019/0373228 A1 Dec. 5, 2019

(30) Foreign Application Priority Data

Jun. 5, 2018 (JP) .................. 2018-108164

(51) Int. Cl.
*H04N 9/31* (2006.01)
*G03B 21/20* (2006.01)

(52) U.S. Cl.
CPC ......... *H04N 9/3155* (2013.01); *G03B 21/206* (2013.01); *H04N 9/312* (2013.01)

(58) Field of Classification Search
CPC .... G03B 21/20; G03B 21/147; G03B 21/206; G03B 21/208; H04N 9/312; H04N 9/3147; H04N 9/3155; H04N 9/3182; H04N 9/3194; G09G 5/00; G09G 5/02; G09G 5/12; G09G 5/14
See application file for complete search history.

(56) References Cited

U.S. PATENT DOCUMENTS

| | | | |
|---|---|---|---|
| 2013/0176539 A1* | 7/2013 | Kilcher | H04N 13/366 353/10 |
| 2018/0196339 A1* | 7/2018 | Okano | G03B 21/28 |

FOREIGN PATENT DOCUMENTS

| | | |
|---|---|---|
| JP | 2007178772 A | 7/2007 |
| JP | 2016004086 A | 1/2016 |
| JP | 2017129701 A | 7/2017 |
| JP | 2017138581 A | 8/2017 |
| JP | 2018063171 A | 4/2018 |

* cited by examiner

*Primary Examiner* — Sultan Chowdhury
(74) *Attorney, Agent, or Firm* — Carter, DeLuca & Farrell LLP

(57) ABSTRACT

An image projection apparatus communicable with another image projection apparatus and having a first internal time includes a time acquirer configured to acquire information of a second internal time included in the other image projection apparatus through a communication, and a controller configured to calculate a difference between the first internal time and the second internal time and to set, using the difference, an operation time for implementing a first operation and a second operation for an adjustment relating to an image projection by the image projection apparatus and the other image projection apparatus.

12 Claims, 12 Drawing Sheets

IMAGE PROJECTION APPARATUS AND ITS CONTROL METHOD

BACKGROUND OF THE INVENTION

Field of the Invention

The present invention relates to a technology regarding an image projection adjustment by synchronizing a plurality of image projection apparatuses (referred to as projectors hereinafter) with each other.

Description of the Related Art

When a large image is projected by connecting images projected by a plurality of projectors to one another, the characteristics of the projection images, such as the brightness and the hue, need to be uniform, and thus the characteristics regarding the image projection of the plurality of projectors needs to be equal to one another.

Japanese Patent Laid-Open No. ("JP") 2017-129701 discloses a method that provides cameras to the first and second projectors, and adjusts a characteristic of each projector using an image obtained by imaging, through each camera, an area including part of a projection image of the first projector and part of a projection image of the second projector. JP 2017-138581 discloses a method of adjusting a characteristic of each projector using an image obtained by imaging a test pattern projected by an associated one of a plurality of projectors, by each of a plurality of cameras.

JP 2007-178772 discloses a contrast improving method that adjusts the brightness (F-number (aperture value)) according to the projection image in order to display a sharper projection image.

However, the methods disclosed in JPs 2017-129701 and 2017-138581 need to accurately synchronize the image projections by a plurality of projectors and the imaging by the cameras with one another. In addition, the brightness adjustment disclosed in JP 2007-178772 in the image projections with a plurality of projectors needs to synchronize the brightness adjustment timings of the plurality of projectors with one another.

SUMMARY OF THE INVENTION

The present invention provides an image projection apparatus and its control method, each of which can provide synchronized timings at which a plurality of operations are performed for adjustments on image projections by a plurality of projectors.

An image projection apparatus according to one aspect of the present invention is communicable with another image projection apparatus and having a first internal time. The image projection apparatus includes a time acquirer configured to acquire information of a second internal time included in the other image projection apparatus through a communication, and a controller configured to calculate a difference between the first internal time and the second internal time and to set, using the difference, an operation time for implementing a first operation and a second operation for an adjustment relating to an image projection by the image projection apparatus and the other image projection apparatus or a timing controller configured to calculate a difference between the first internal time and the second internal time and to perform, using the difference, an operation such that the image projection apparatus and the other image projection apparatus have synchronized image projection timings.

A control method corresponding to the above image projection apparatus and a non-transitory computer-readable storage medium storing a computer program for causing a computer of an image projection apparatus to execute processing according to the control method also constitute another aspect.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
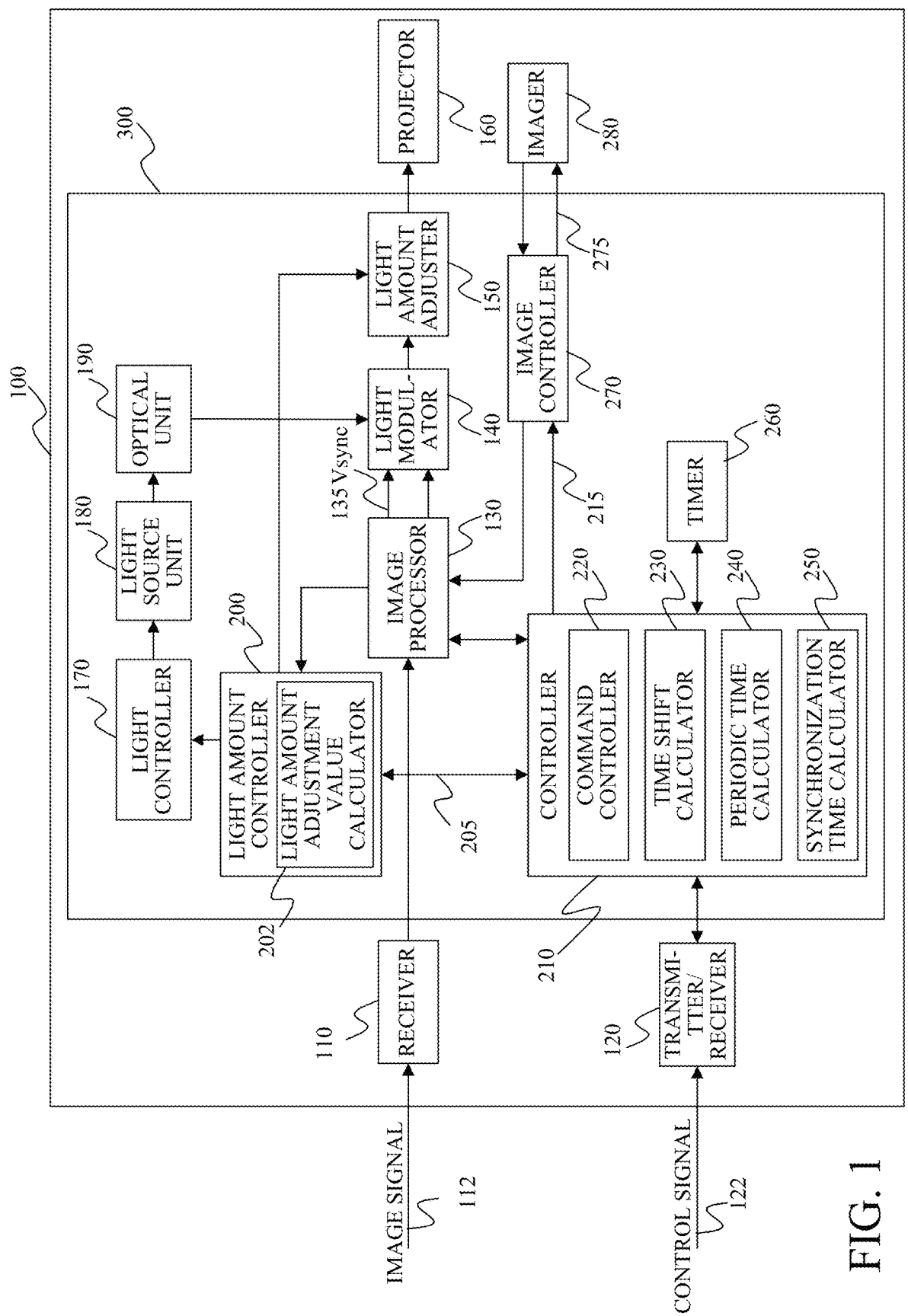
FIG. 1 is a block diagram showing a configuration of a projector according to a first embodiment of the present invention.
Figure 2:
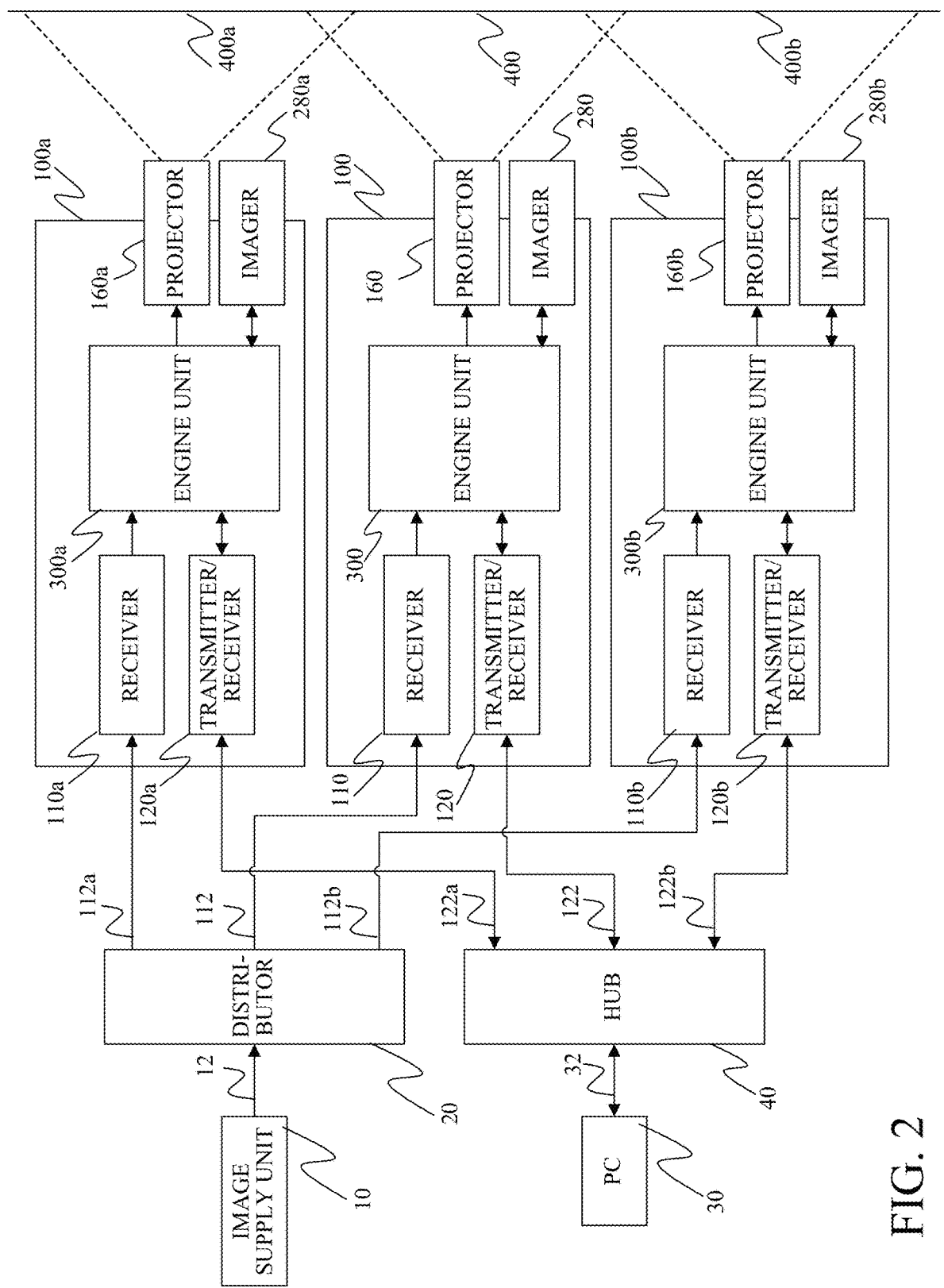
FIG. 2 is a block diagram showing a configuration of a plurality of projectors according to the first embodiment.

FIG. 1 illustrates a configuration of a projector 100 as an image projection apparatus according to a first embodiment of the present invention. FIG. 2 illustrates a usage mode for projecting an image using a plurality of (totally three) projectors including the projector 100 illustrated in FIG. 1 and two other projectors 100a and 100b each having the same configuration as that of FIG. 1.

In FIG. 2, an image supply device 10, such as a DVD player, outputs an image signal to a distributor 20 via a cable 12. The image signal, as used herein, includes image signals of a variety of standards, such as the HDMI standard and the DisplayPort standard. The resolution of the image signal covers a wide variety, such as 1280×720 pixels, 1920×1080 pixels, 2560×1440 pixels, 4K (3840×2160) pixels or 8K (7680×4320) pixels. The distributor 20 divides the input image signal into three and outputs the image signal to the three projectors 100, 100a, and 100b via cables 112, 112a, and 112b. The image signal may be simply distributed from the distributor 20 without being divided into three, and an area to be displayed in the image signal may be trimmed in each projector.

While this embodiment describes three projectors, this is merely an example, and two, or four or more projectors may be used. For example, four projectors each configured to project an image with a resolution of 1920×1200 pixels may be connected to the distributor 20. The image signal having a resolution of 4K pixels output from the image supply device 10 may be divided into four by the distributor 20, four projectors may project four divided images onto the four areas in the upper, lower, right, and left directions, and the 4K image can be connected together.

The projector 100 includes an engine unit 300 that includes an image processor 130, a controller 210, a light source unit 180, a light source controller 170, an optical unit 190, a light modulator 140, a light controller 150, a light amount controller 200, an imaging controller 270, and a time unit 260. The projectors 100a and 100b similarly include engine units 300a and 300b.

The engine units 300, 300a, and 300b of the projectors 100, 100a, and 100b receive the image signals from the distributor 20 through the receiving units 110, 110a, and 110b, perform various image processing for the image signals, and generate a drive signal for driving a modulator 140. The light modulator 140 driven by the drive signal modulates the illumination light incident from the light source unit 180 via the optical unit 190. Thereby, the projectors 100, 100a, and 100b respectively project images (projection images) 400, 400a, and 400b onto projection surfaces such as screens via projectors 160, 160a, and 160b.

The projectors 100, 100a, and 100b respectively include transmitters/receivers 120, 120a, and 120b as communication units. Each transmitter/receiver can communicate wirelessly or by wire. A communication may be performed through a LAN by the Ethernet.

The transmitter/receiver 120 in the projector 100 is connected to the engine unit 300 (controller 210) and similarly, the transmitters/receivers 120a and 120b in the projectors 100a and 100b are connected to the engine units 300a and 300b. The controllers 210, 210a, and 210b in the respective projectors transmit and receive image processing information, unique information, and maintenance information of the projectors to and from controllers of other projectors. The controllers 210, 210a, and 210b in the respective projectors transmit and receive various commands to and from controllers of other projectors.

The transmitter/receivers 120, 120a, and 120b are connected to a hub (HUB) 40 as a network switching unit, wirelessly or via cables 122, 122a, and 122b. The HUB 40 is an access point, a switching hub, a bridge for a wireless connection or the like, and is an L2 switch in the OSI reference model (a switch that switches by a MAC address in a data link layer of layer 2).

A PC 30 may be connected to the HUB 40 via the cable 32. The PC 30 collects and manages information indicating the internal state, the maintenance history, and the like of each projector.

Next follows a description of an operation regarding the image projection of the projector 100 illustrated in FIG. 1. This operation is the same for the other projectors 100a and 100b illustrated in FIG. 2.

The light source controller 170 drives the light source unit 180. The light source unit 180 includes a high pressure mercury lamp, an LED, a laser diode (LD), or the like. The LED or LD can change the emission luminance by changing the current or voltage that drives it.

The optical unit 190 includes a variety of optical elements, such as a mirror, a prism, a polarization plate, and a lens. The light modulator 140 includes a light modulation element, such as a transmission type liquid crystal panel, a reflection type liquid crystal panel, or a digital micromirror device (referred to as a light modulation panel hereinafter), and a panel drive circuit that drives the light modulation element. The resolution of the light modulation panel may have, for example, a WUXGA (1920×1200 pixels) or FHD (1920×1080 pixels), or higher or lower resolution.

When three light modulation panels for R (red), G (green) and B (blue) are used, the light from the light source unit 180 is separated into the R light, the G light and the B light by the optical unit 190 and each color light is led as illumination light to the corresponding light modulation panel. These light modulation panels are driven by the panel drive circuit according to the drive signal from the image processor 130 to modulate the respective color lights. The modulated R light, G light, and B light are combined by an unillustrated combining optical system and become the image projection light.

When a single light modulation panel is used, white light from the light source unit 180 is temporally divided by an unillustrated color wheel or the like to sequentially generate the R light, the G light, and the B light. The light modulation panel is driven by a panel drive circuit according to the drive signal from the image processor 130 to modulate each color light. The modulated R light, G light, and B light respectively become image projection light.

The light amount of the image projection light emitted from the light modulator 140 is adjusted by the light controller 150. The light controller 150 includes a diaphragm or the like, and adjusts the light amount by shielding part of the incident image projection light. The image projection light having a light amount controlled by the light controller 150 is enlarged and projected onto the projection surface by the projector 160 (the projectors 160a and 160b in the other projectors 100a and 100b). Thereby, the projection image is displayed.

Herein, the light modulation panel of the light modulator 140 is driven by a line sequential drive scanning method or a surface sequential drive scanning method. For example, when the resolution of the light modulation panel is 1920×1200 pixels in the line-sequential drive scanning method, first, 1920 pixels in the first row in the horizontal direction are driven according to the drive signal from the image processor 130 and the 1920 pixels in the second row are next driven. The drive pixel row is changed at the generation timing of the horizontal synchronization signal of the image signal. For example, when the frame rate is 60 Hz, the horizontal synchronization signal is a synchronization signal having a frequency of 72 kHz or higher, which is 1200 times or higher of it.

When driving of 1920 pixels in the 1200th line in the vertical direction is finished, a vertical synchronization signal (timing signal having a predetermined period) of the image signal is generated, and driving of the next frame is started at that timing. For example, when the frame rate is 60 Hz, the vertical synchronization signal has a frequency of 60 Hz. This vertical sync signal is shown as 135 Vsync in FIG. 1. The Vsync signal is a vertical synchronization signal that represents the head of each frame when the light modulation panel is driven by the light modulator 140. In synchronizing with the projection image, it is necessary to detect the timing of this vertical synchronization signal.

Thus, the line sequential drive scanning method drives pixel rows in the horizontal direction for each pixel row in the vertical direction. On the other hand, the surface sequential drive scanning method previously writes drive data of all pixels of the light modulation panel for one frame in the image signal in the memory, and simultaneously wholly reflects the drive data for all the pixels according to the vertical synchronization signal.

Since the vertical synchronization signal indicates the head frame timing or the frame rewriting timing in the image signal, the updating (switching) timing at which the projection image is sequentially updated can be detected by detecting the vertical synchronization signal, regardless of the panel driving method.

In FIG. 1, the projector 100 includes an imager 280 configured to capture the projection image. The imager 280 includes an image sensor, such as a CCD sensor and a CMOS sensor, and an imaging optical system configured to form an optical image of an object (projection image) on the image sensor.

The imaging controller 270 controls the imaging timing of the imager 280 through a timing signal 275, and transmits the imaging data from the imager 280 to the image processor 130. The other projectors 100a and 100b similarly have imagers 280a and 280b.

The following description assumes that the projector 100 is a master projector (first image projection apparatus) and the other projectors 100a and 100b are slave projectors (second image projection apparatus). The imager 280 of the master projector 100 can capture not only the projection image 400 projected by the projector 100 but also at least part of the projection images 400a and 400b projected by the slave projectors 100a and 100b.

The brightness (luminance) of the projection image and the RGB hues change according to the states of ambient light and the projection surface on which the projection image is projected, and also depend on the setting (characteristic) of the projector itself. Thus, it is desirable to capture a projection image, confirm its luminance and hue, and make adjustment so as to provide a projection image having the targeted luminance and hue for setting of a plurality of projectors. At this time, the imaging sensitivities of the imagers 280, 280a, and 280b are not necessarily equal to each other, and even when the same projection image is imaged, the luminance and the hue in the imaged image may be different.

One of effective adjustment methods in this case is to make the master and slave projectors 100, 100a, and 100b project the projection images 400, 400a, and 400b, and the imager 280 of the master projector 100 capture these projection images 400, 400a, and 400b. The settings of the slave projectors 100a and 100b are adjusted using the captured image obtained by the imager 280.

Figure 3:
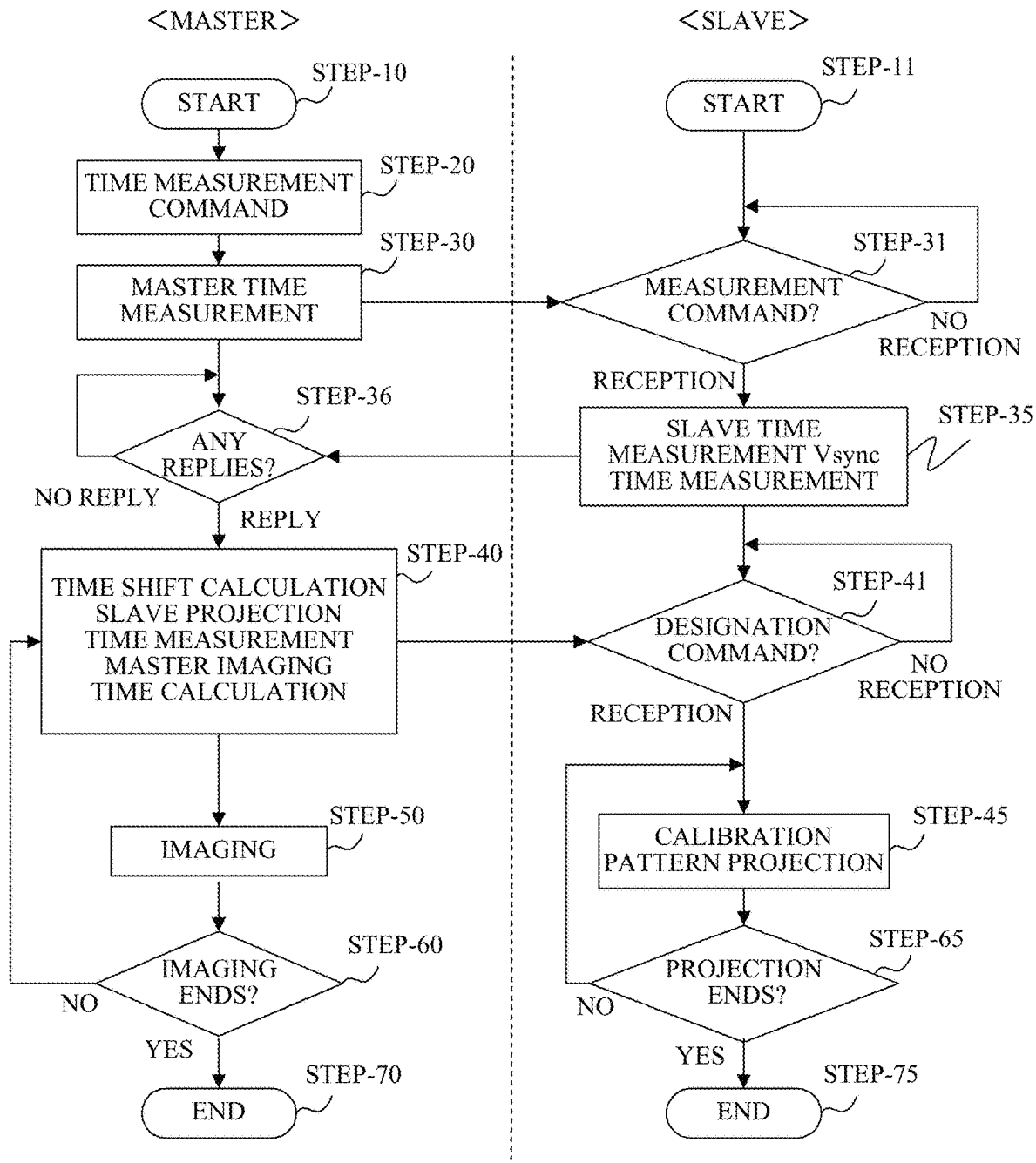
FIG. 3 is a flowchart of processing performed by a master projector and a slave projector according to the first embodiment.
Figure 4:
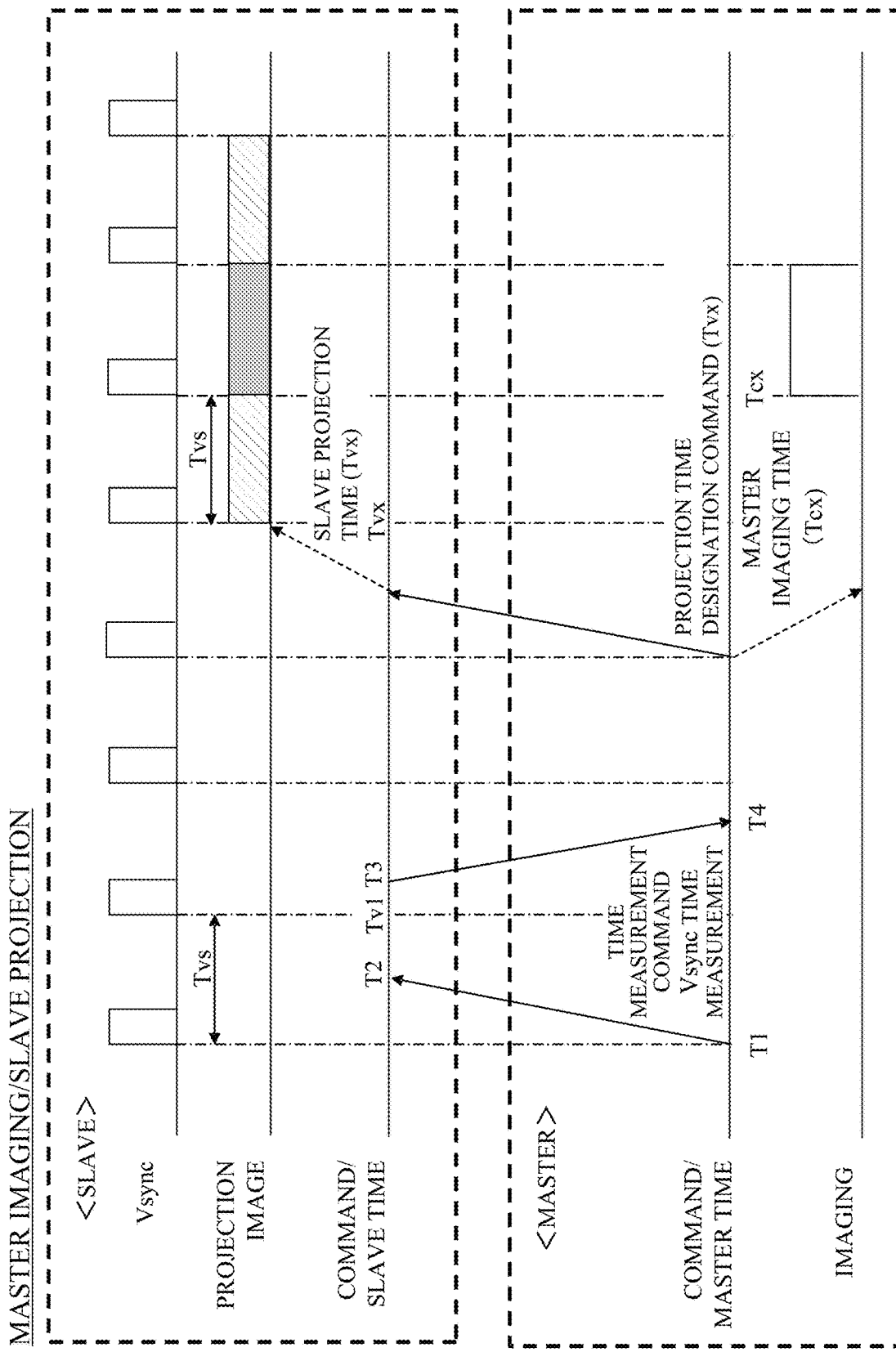
FIG. 4 illustrates a master time, a slave time, and command transmission and reception timings according to the first embodiment.

Referring now to FIGS. 1, 3, and 4, a description will be given of the operation of each projector at this time. The controller 210 of the projector 100 illustrated in FIG. 1 includes a command controller 220. The command controller 220 transmits and receives commands to and from the other projectors 100a and 100b or the PC 30 illustrated in FIG. 2 via the transmitter/receiver 120 of the projector 100.

A flowchart of FIG. 3 illustrates a flow of processing (control method) performed by the master projector 100 and the slave projectors 100a and 100b. The controller 210 in the master projector 100 serves as a time acquirer and a controller. The controller 210 as a computer executes this processing according to a computer program. This applies to processing performed in other embodiments described later. In the following description, the symbols (100, 100a, 100b) of the master projector and the slave projectors are omitted unless otherwise required.

In the Step-10, the master projector (controller 210) receives the adjustment command transmitted by the user through the PC 30. The adjustment command is a command for causing the slave projector to project an image and for causing the imager 280 of the master projector to perform imaging. The image projection and imaging correspond to a first operation and a second operation for an adjustment of the image projection, respectively. In the Step-11, the slave projector starts processing.

The master projector (command controller 220) having received the adjustment command generates a time measurement command, which will be described later, in the Step-20. The time measurement command is a command that causes the slave projector to measure the internal time when the time measurement command is received and the Vsync time described later. In the following description, the internal time of the slave projector will be referred to as slave time.

In the Step-30, the master projector transmits a time measurement command to the slave projector, and measures the internal time of the master projector indicating the transmission time. In the following description, the internal time of the master projector will be referred to as master time.

The slave projector that has received the time measurement command in the Step-31 measures slave reception time as the slave time when the time measurement command is received in the Step-35, and Vsync time as the slave time when the vertical synchronization signal Vsync is generated just after it.

FIG. 4 illustrates an example of the master time, the slave time, and the command transmission and reception timing in this embodiment. The projectors 100, 100a, and 100b respectively have time units 260, 260a, and 260b. Each of the time units 260, 260a, and 260b uses, as the internal time, the standard time of the time zone at the installation location of each projector set by a specific server such as an NTP (Network Time Protocol) server. Each time unit 260, 260a, and 260b may count its own (local) internal time in the corresponding projector. This local internal time may have a resolution of 1 ms or less. In this embodiment, the internal time (master time) of the master projector as the first image projection apparatus corresponds to the first internal time, and the internal time (slave time) of the slave projector as the second image projection apparatus corresponds to the second internal time.

In the Step-30, the master projector measures command transmission time T1 as the master time when the time measurement command is transmitted to the slave projector. In the Step 35, the slave projector measures a Vsync time Tv1 and command reception time T2 as the slave time when the time measurement command is received. Assume that the period of the vertical synchronization signal Vsync (referred to as a synchronization period hereinafter) is Tvs and the frame rate of the image signal is 60 Hz. Then, Tvs=16.66 ms. Assume that the time measurement resolution is 1 ms. Then, the time unit 260 of the slave projector can specify the Vsync time Tv1 synchronized with the vertical synchronization signal Vsync with an accuracy of about 1 ms.

In the Step-35, the slave projector collectively sends, as slave time information, T2 and Tv1 and an information reply time T3 as the slave time for replying them to the master projector 100, to the master projector.

The master projector (controller 210) waits for the reply of the slave time information from the slave projector in the Step-36, and proceeds to the Step-40 when the slave time information is received. In the Step-40, the master projector measures information reception time T4 as the master time when the slave time information (T2, Tv1, and T3) is received. The time shift calculator 230 in the controller 210 calculates the difference (displacement amount) ΔT between the master time and the slave time using the following equation (1).

$$\Delta T = \{(T2-T1)-(T4-T3)\}/2 \quad (1)$$

For example, assume that T1=0, the slave time shifts (advances) by 5 ms relative to the master time, it takes 1 ms to transmit and receive commands between the master projector and the slave projector, respectively, and it takes only 3 ms from the reception of the time measurement command to the transmission of the slave time information. Then, T1=0, T2=5+1=6, T3=6+3=9, and T4=5. When they are substituted for the expression (1), the following relationship is obtained.

$$\Delta T = \{(6-0)-(5-9)\}/2 = 5$$

It is calculated that the slave time shifts (advances) by ΔT=5 ms relative to the master time.

The period time calculator 240 in the controller 210 calculates the Vsync time Tvn using Tv1 using the following equation (2) where m is an integer of 1 or more.

$$Tvn = Tv1 + m \times Tvs \quad (2)$$

The expression (2) is a general expression representing the timing of the vertical synchronization signal Vsync as the slave time.

The synchronization time calculator 250 in the controller 210 sets the slave projection time (first operation time) Tvx as the slave time when the slave projector performs the image projection in synchronization with Vsync time Tvn. The command controller 220 transmits a projection time designation command indicating the slave projection time Tvx to the slave projector where m is an integer of 1 or more.

$$Tvx = Tv1 + n \times Tvs \quad (3)$$

The synchronization time calculator 250 sets a master imaging time (second operation time) Tcx as the master time when the imager 280 of the master projector images the projection image in synchronization with the image projection by the slave projector using the expression (4).

$$Tcx = Tvx - \Delta T \quad (4)$$

The slave projector having received the projection time designation command in the Step-41 starts an operation (a projection preparation operation and a projection operation to be described later) for projecting a predetermined calibration pattern image from the slave projection time Tvx in the Step-45.

On the other hand, in the Step 50, the master projector (controller 210) causes the imager 280 to capture the calibration pattern image from the master imaging time Tcx.

The slave projector determines in the Step-65 whether or not all of the one or more prepared calibration pattern images have been projected. If there is a calibration pattern image that has not yet been projected, the flow returns to the Step-45 to project the calibration pattern image. On the other hand, if all calibration pattern images have been projected, the slave projector ends the processing in the Step-75.

Similarly, in the Step-60, the controller 210 of the master projector determines whether all the imaging of one or more calibration pattern images have been completed. If there are calibration pattern images that have not been captured yet, the processing of the Step-40 and the Step-50 is performed. On the other hand, if all calibration pattern images have been projected, the controller 210 ends this processing in the Step-70.

In FIG. 4, the slave projector performs a projection preparation operation for driving the light modulation panel of the slave projector in accordance with the calibration pattern image in a projection preparation period indicated by bevel lines between the slave projection time Tvx and the synchronization period Tvs. The projection preparation operation is an operation of writing drive data corresponding to the calibration pattern image to the light modulation panel for each pixel row when the light modulation panel is driven by the line sequential drive scanning method. In driving the light modulation panel by the surface sequential drive scanning method, it is an operation of writing drive data for one frame in all pixels in the light modulation panel. When writing of the drive data in the light modulation panel (updating the projection image) is completed, the period illustrated in gray in the figure starts.

A gray period is a period for driving the light modulation panel of the slave projector according to the drive data corresponding to the calibration pattern image or a projection period in which the projection operation for projecting the calibration pattern image is performed. The master projector captures the projected calibration pattern image during a predetermined time after the master imaging time Tcx in accordance with the projection period. FIG. 4 illustrates imaging of the calibration pattern image for one frame.

Then, as soon as the projection period of this calibration pattern image ends, a projection preparation period shown by bevel lines starts, and during this projection preparation period, the slave projector prepares to drive the light modulation panel according to the calibration pattern image of the next frame.

In this embodiment, the image projection by the slave projector and the imaging by the master projector are synchronized with each other in the order of 1 ms. Thus, the master projector can capture the calibration pattern image while the slave projector correctly projects the calibration pattern image. In other words, this embodiment can avoid imaging from being performed in the middle of writing (rewriting) the drive data into the light modulation panel, and obtain a captured image necessary to make equal the luminances and hues of the projected images from three projectors (the result of the second operation). As a result, the adjustment time can be shortened.

In this manner, this embodiment causes the slave projector to project the calibration pattern image, the imager 280 of the master projector to acquire the captured image, the master projector to project the calibration pattern image, and the imager 280 of the master projector to acquire the captured image. Then, these captured images are compared with one another, and the settings of the slave projectors are adjusted so that the luminance and the hue of the projection images from the three projectors become equal to each other.

For example, the setting relating to the luminance is adjusted when the light source controller 170 controls the current value for driving the light source unit (light amount adjuster) 180 so that the light source unit 180 can be driven by the target current value calculated by the light amount adjustment value calculator 202 of the light amount controller 200. Alternatively, the diaphragm of the light controller (light amount adjuster) 150 may be controlled so as to be the target F-number calculated by the light amount adjustment value calculator 202 of the light amount controller 200.

The setting regarding the hue can be adjusted by controlling the R, G and B gains of the light modulator 140 to the image signal by the image processor (color adjuster) 130.

The luminance and the hue of the projection image may be adjusted by at least one of the master projector and the slave projector.

Each projector may include a combination of a prism, a diffraction grating, a lens, and the like, in place of the imager, and may have a spectrometer that measures the spectrum of the image projection light. Use of the result of the spectrometric measurement (second operation) by the spectrometer, as in using the imager, can adjust the settings of the slave projectors to make equal the luminance and the hue of the projection images from the three projectors. This is the same as other embodiments described later.

Since the master projector captures the projection image or performs the spectrometric measurement of the image projection light correctly synchronized with the image projection of the slave projector, this embodiment can obtain a good captured image or a spectrometric measurement result necessary to adjust the setting of the slave projector. Thus, the luminance and the hue of the projection images from the plurality of projectors can be quickly and properly made equal to each other.

The PC 30 may serve as the image supply device. The calibration pattern image may be projected for a predetermined number of frames (time).

Second Embodiment

Next follows a description of a second embodiment according to the present invention. The second embodiment describes a master projector projecting a calibration pattern image and a slave projector capturing an image. The configuration of each projector in this embodiment is the same as that illustrated in FIGS. 1 and 2.

Figure 5:
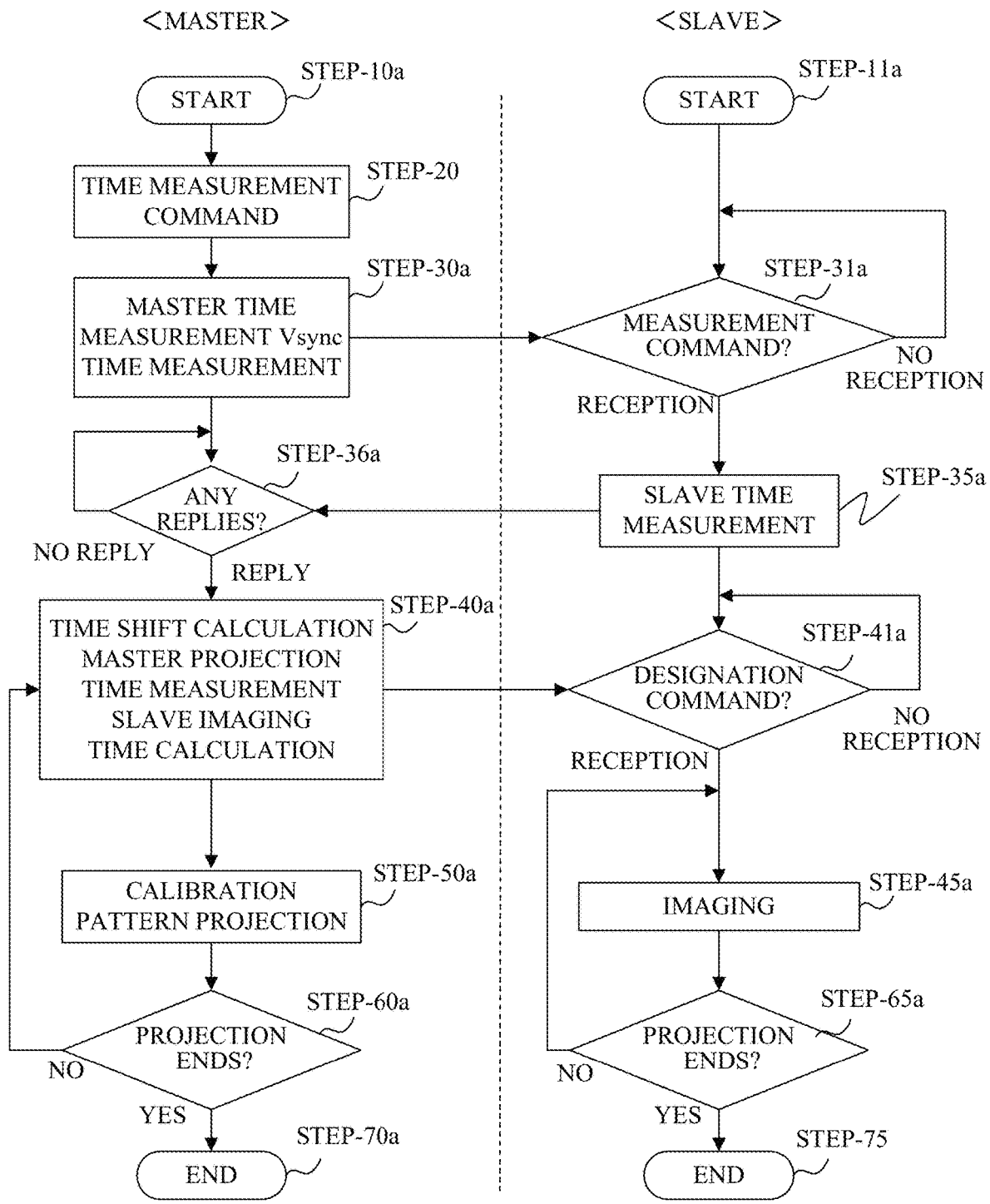
FIG. 5 is a flowchart of processing performed by a master projector and a slave projector according to a second embodiment of the present invention.

A flowchart in FIG. 5 illustrates command transmission and reception processing in the master projector and the slave projector according to this embodiment.

In the Step-10a, the master projector (controller 210) receives the adjustment command transmitted by the user through the PC 30. This adjustment command is causes the imagers 280a and 280b in the slave projector to perform imaging and the master projector to project an image. In the Step-11a, the slave projector starts processing.

The master projector (command controller 220) having received the adjustment command generates a time measurement command in the Step-20. The time measurement command according to this embodiment is a command that causes the slave projector to measure the time when the time measurement command is received.

Next, in the Step-30a, the master projector transmits a time measurement command to the slave projector, and measures the master time indicating the transmission time and the Vsync time just following it. The slave projector having received the time measurement command measures the slave time when the time measurement command is received, in the Step-35a.

Figure 6:
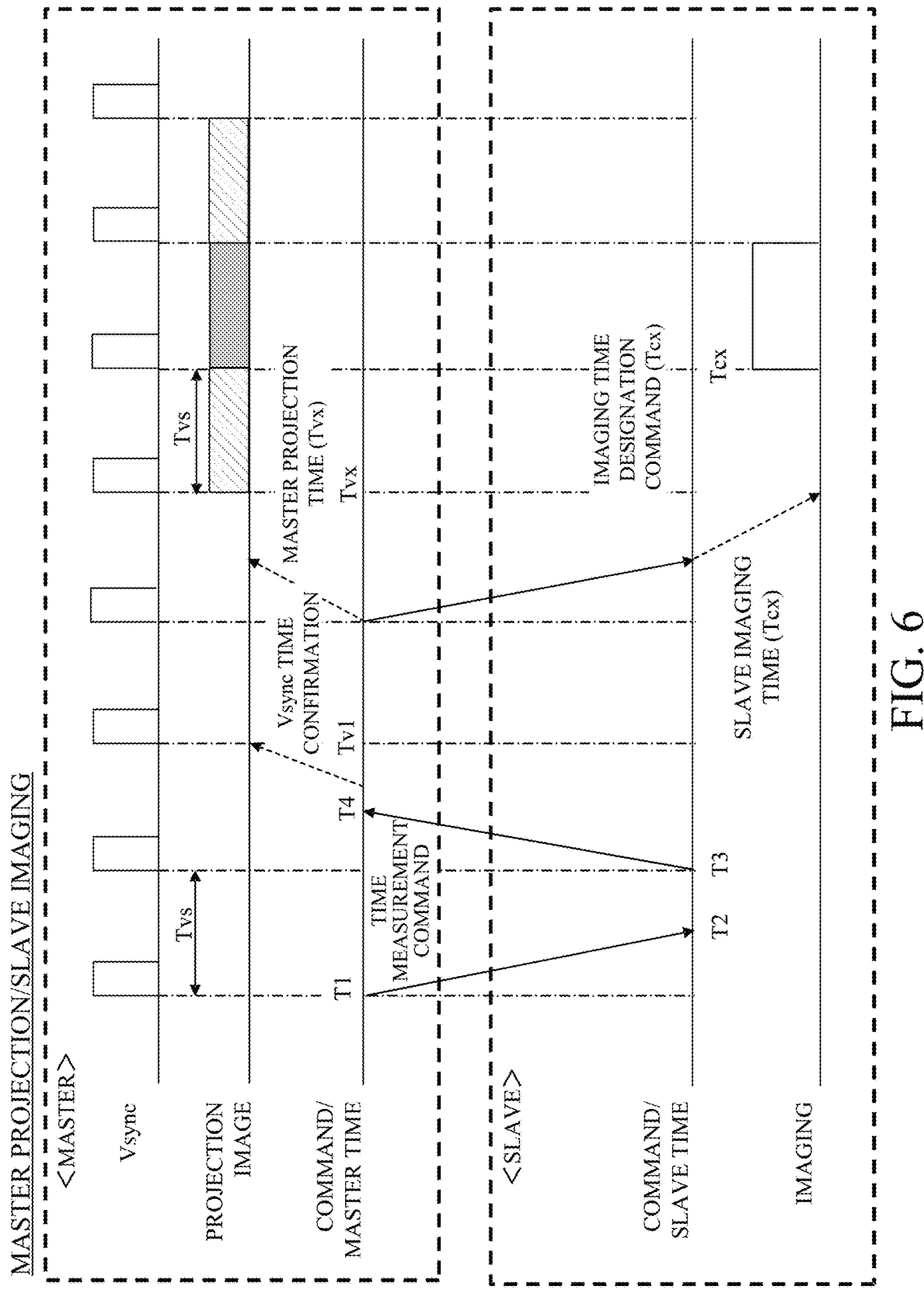
FIG. 6 illustrates a master time, a slave time, and command transmission and reception timings according to the second embodiment.

FIG. 6 illustrates an example of the master time, the slave time, and the command transmission and reception timing according to this embodiment. Similar to the first embodiment, the master and slave projectors have the standard time set by the specific server or the projector's own internal time as the master time and slave time.

In the Step-30a, the master projector measures a Vsync time and a command transmission time T1 as the master time when the time measurement command is transmitted to the slave projector. The slave projector that has received the time measurement command in the Step-31a measures command reception time T2 as the slave time when the time measurement command is received, in the Step-35a. Then, this T2 and information reply time T3 as the slave time to reply this to the master projector are collectively sent back as the slave time information to the master projector.

The master projector (controller 210) having received the slave time information in the Step-36a measures information reception time T4 as the master time when the slave time information (T2 and T3) from the slave projector is received, in the Step 40a. The time shift calculator 230 in the controller 210 calculates a shift amount ΔT between the master time and the slave time using T1, T2, T3, and T4 and the expression (1) described according to the first embodiment.

The cycle time calculator 240 in the controller 210 calculates the Vsync time Tvn using Tv1 and the expression (2) described in the first embodiment. The synchronization time calculator 250 in the controller 210 calculates, in synchronization with the Vsync time Tvn, the master projection time (first operation time) Tvx as the master time when the master projector projects an image, using the expression (3) described in the first embodiment.

The synchronization time calculator 250 calculates, using the following expression (5), slave imaging time (second operation time) Tcx as the slave time when the imagers 280a and 280b in the slave projectors capture projection images in synchronization with the image projection by the master projector. The command controller 220 transmits an imaging time designation command indicating the slave imaging time Tcx to the slave projector, where n is an integer of 1 or more.

$$Tcx = Tv1 + n \times Tvs + \Delta T \qquad (5)$$

The master projector (controller 210) starts an operation (a projection preparation operation and a projection operation) for projecting the calibration pattern image from the master projection time Tvx in the Step-50a.

On the other hand, the slave projector having received the imaging time designation command in the Step-41a causes the imagers 280a and 280b to capture the calibration pattern images from the slave imaging time Tcx in the Step-45a.

The master projector (controller 210) determines whether or not all of one or more prepared calibration pattern images have been projected in the Step-60a. If there is a calibration pattern image that has not yet been projected, the flow returns to the Step-40 to project the calibration pattern image. On the other hand, if all calibration pattern images have been projected, the master projector ends this processing in the Step-70.

On the other hand, the slave projector similarly, in the Step-65a, determines whether all of one or more calibration pattern images is completely captured. If there is a calibration pattern image that has not yet been captured, the image is captured in the Step-45a. On the other hand, if all calibration pattern images have been captured, the flow ends in the Step-75.

In FIG. 6, the master projector performs the projection preparation operation for driving the light modulation panel of the master projector in accordance with the calibration pattern image in the projection preparation period shown by bevel lines between the master projection time Tvx and the synchronization period Tvs. This projection preparation operation is the same as the operation performed by the line sequential drive scanning method or the surface sequential drive scanning method described with reference to FIG. 4 in the first embodiment.

A gray period is a period in which the light modulation panel of the master projector is driven according to the calibration pattern image or a projection period in which the projection operation for projecting the calibration pattern image. The slave projector captures the projected calibration pattern image during a predetermined time from the slave imaging time Tcx in synchronization with the projection period. FIG. 6 illustrates imaging of the calibration pattern image for one frame.

As soon as this imaging ends, the projection preparation period shown by the bevel lines starts, and in this projection preparation period, the master projector performs the preparation operation for driving the light modulation panel according to the calibration pattern image for the next frame.

This embodiment synchronizes the image projection by the master projector and the imaging by the slave projector with each other in the order of 1 ms. Thus, the slave projector can capture the calibration pattern image while the master projector correctly projects the calibration pattern image. In other words, this embodiment can avoid that imaging from being performed in the middle of writing (rewriting) of the drive data into the light modulation panel, and acquire a captured image necessary for an adjustment to equalize the luminance and the hue of the projection image. As a result, the required adjustment time can be shortened.

Thus, this embodiment causes the master projector to project the calibration pattern image, the imagers 280a and 280b of the slave projectors to acquire captured images, the slave projector to project the calibration pattern image, and the imagers 280a and 280b to acquire the captured images. Then, these captured images are compared with each other, and the settings of the slave projectors are adjusted so that the luminances and the hues of the projected images from the three projectors become equal to each other. The imaging sensitivity may be controlled by the imaging controller 270 of each projector so that the imaging sensitivities of the imagers 280, 280a, and 280b become equal to each other.

Since the slave projectors capture the projection images or perform the spectrometric measurements of the image projection light in synchronization with the image projection of the master projector, this embodiment can obtain a good captured image or a spectrometric measurement result necessary to adjust the settings of the slave projectors. Thus, the luminances and the hues of the projected images from the plurality of projectors can be quickly and properly equal to each other.

Third Embodiment

Figure 7:
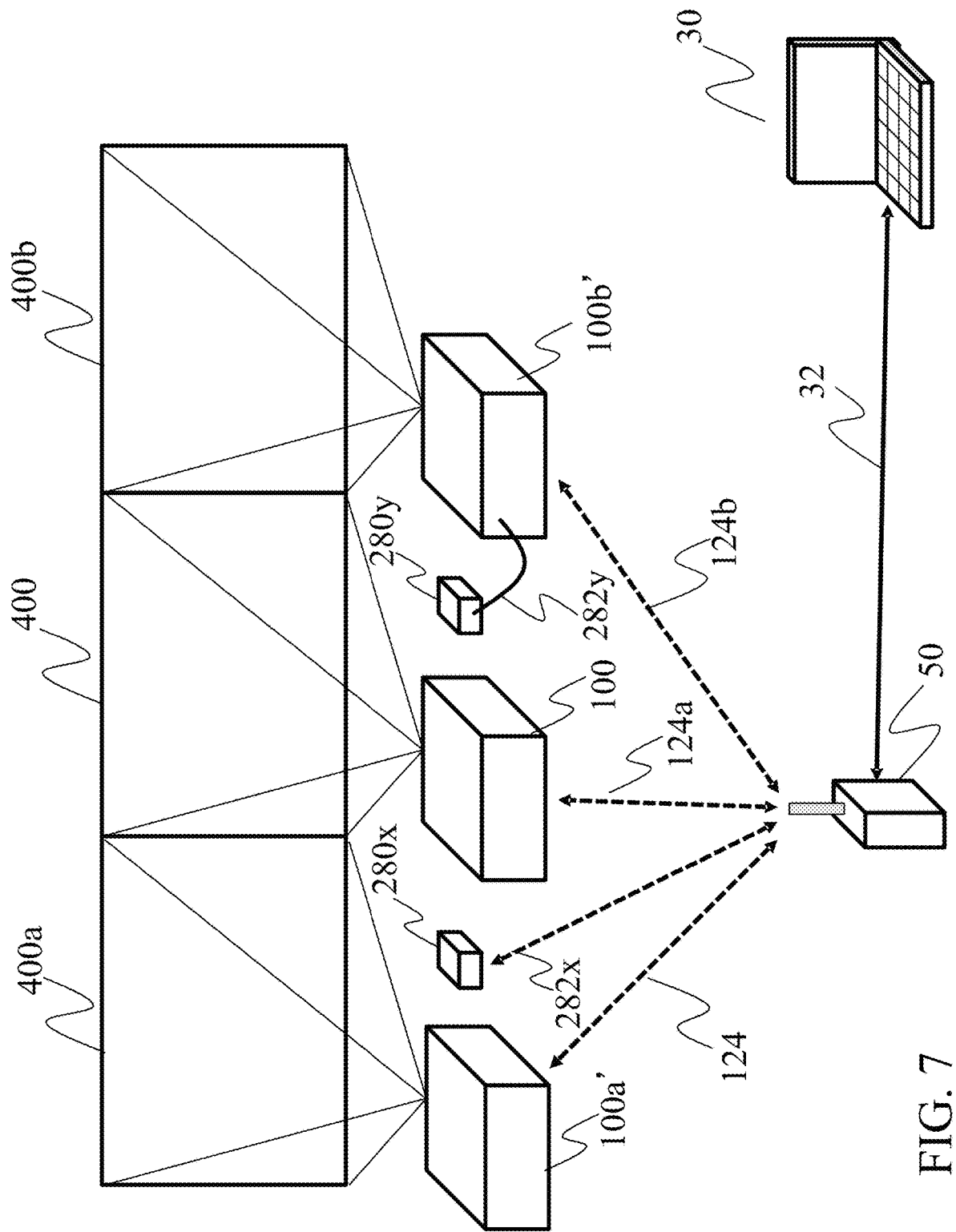
FIG. 7 is a block diagram showing a configuration of a plurality of projectors according to a third embodiment of the present invention.

Referring now to FIG. 7, a description will be given of a third embodiment according to the present invention. The third embodiment is a variation of the second embodiment, and the master projector 100 projects the calibration pattern image in the same manner as in the second embodiment. However, the calibration pattern image projected by the master projector 100 is captured by imaging devices (imagers) 280x and 280y provided separately from the slave projectors 100a' and 100b'. The imaging devices 280x and 280y each have at least one of a wireless communication function and a wired communication function.

Each of the projectors 100, 100a', and 100b' is connected to the PC 30 via an access point 50 by wireless LANs 124, 124a, and 124b such as the Wi-Fi. FIG. 3 omits the image supply device 10 illustrated in FIG. 1.

The imaging device 280x is connected to the access point 50 by a wireless LAN 282x. The imaging device 280y is connected to the slave projector 100b' via a cable (such as a USB cable) 282y, and can communicate via the slave projector 100b'. Thus, the projectors 100, 100a', and 100b' and the imaging devices 280x and 280y are communicably connected to one another.

However, the imaging device 280y may be connected to the slave projector 100a' via the cable, or may be connected to the access point 50 by the wireless LAN.

The operations of the master and slave projectors according to this embodiment are the same as those in the second embodiment except that the imaging devices 280x and 280y as the slave devices perform imaging instead of the imagers 280a and 280b in the second embodiment.

The imaging devices 280x and 280y use a standard time set by a specific server, such as an NTP server, as the internal time (referred to as imaging device time hereinafter). The imaging device 280x or 280y receives a time measurement command from the master projector 100. In the following description, reference numerals of the master projector and the imaging device will be omitted.

The imaging device having received the time measurement command collectively sends, as imaging device time information, command reception time T2 as the imaging device time when the time measurement command is received, and information reply time T3 as the imaging device time to send it back to the master projector 100, to the master projector.

The master projector calculates a shift amount ΔT between the master time and the imaging device time using the expression (1), similar to the Step-40 of FIG. 5. Moreover, the master projector calculates, using the expressions (3) and (5), the master projection time (first operation time) and the imaging time by the imaging device 280x in synchronization with and the vertical synchronization signal Vsync (second operation time: referred to as device imaging time hereinafter). The master projector transmits the device imaging time to the imaging device.

Then, the master projector projects the calibration pattern image at the master projection time Tvx similar to the Step-50a in FIG. 5. The imaging device captures the calibration pattern image during a predetermined time after the device imaging time in the Step-45a. The subsequent operation is the same as that of the second embodiment, so the description thereof will be omitted.

Similar to the first embodiment, this embodiment may project the calibration pattern image by the slave projector 100a' or 100b'. Even in this case, the master projector calculates the shift amount ΔT between the master time and the imaging device time, calculates the slave projection time and the device imaging time to project and capture the calibration pattern image using the shift amount ΔT.

Instead of the imaging devices 280x and 280y, as described in the first embodiment, a spectrometer for spectrometrically measuring the image projection light may be provided, and the setting of the slave projector may be adjusted using the spectrometric measurement result.

Since the projection image by the imaging device is captured or the spectrometric measurement of the image projection light is performed in exact synchronization with the image projection of the projector, this embodiment can obtain a good imaged image or a good spectral measurement result necessary to adjust the setting of the slave projector. Thus, the luminances and the hues of the projection images from the plurality of projectors can be properly and quickly equal to one another.

Fourth Embodiment

Next follows a description of a fourth embodiment according to the present invention. The configuration of each projector in the fourth embodiment is the same as that illustrated in FIGS. 1 and 2.

A high contrast ratio is often demanded for a projection image. The contrast ratio is a luminance ratio between the maximum luminance (white) and the minimum luminance (black) in the projection image. When the contrast ratio is high, the difference between the brightness and the darkness is large and a sharper projection image can be obtained.

One contrast ratio improving method is a method of changing (adjusting) the luminance of the projection image according to the brightness of the image signal. For example, when the image signal is bright, a higher luminance image is projected, and when the image signal is dark, a lower luminance image is projected. The luminance of the projection image can be adjusted by controlling the light controller (diaphragm) 150 that adjusts the light amount projected from the projector 160 illustrated in FIG. 1. When the LD or LED is used for the light source unit 180, the light source controller 170 can control the current value for driving the light source unit 180.

The luminance of the projection image as the image differs according to frames. For example, when the frame rate is 60 Hz, the luminance may change every 16.6 ms. If the frame rate is 120 Hz, which is called a high frame rate, the luminance may change every 8.3 ms. In order to improve the contrast ratio, the light controller 150 and the light source unit 180 may be controlled in a time equivalent with the frame rate.

On the other hand, the "luminance" of the projection image is calculated as an image feature amount by the image processor 130 illustrated in FIG. 1. The "luminance" is calculated and updated for each frame, for example, as the maximum luminance, as the minimum luminance, or as the average luminance of the projection images.

For example, where an image signal from the image supply device 10 is divided by the distributor 20 and the image projections are performed by a plurality of projectors, the master projector collects the image feature amount calculated by the image processor (feature amount acquirer) 130 in each projector. The master projector finds at least one of the maximum luminance, the minimum luminance, and the average luminance of all projection images based on the collected image feature amount, and calculates the control amount (adjustment amount) over the light controller 150 or the light source unit 180 of the master and slave projectors according to the result.

The master projector transmits to the slave projector the adjustment amount calculated for the slave projector, and controls the light controller 150 or the light source unit 180 according to its adjustment amount. The slave projector adjusts (controls) the light controller 150 or the light source unit 180 according to the received adjustment amount. The adjustment of the light controller 150 or the light source unit 180 in each of the slave projector and the master projector or the light amount adjustment corresponds to the first operation and the second operation for the adjustment regarding the image projection.

At this time, a process from the collection of the image feature amount to the control over the light controller 150 or the light source unit 180 may be terminated within one frame. Thus, the delay times in the transmission and reception of the image feature amount and the adjustment amount between the master projector and the slave projector may be made as short as possible, and the timing when the light controller 150 or the light source unit 180 in all the projectors is controlled needs to be synchronized with one another.

Figure 8:
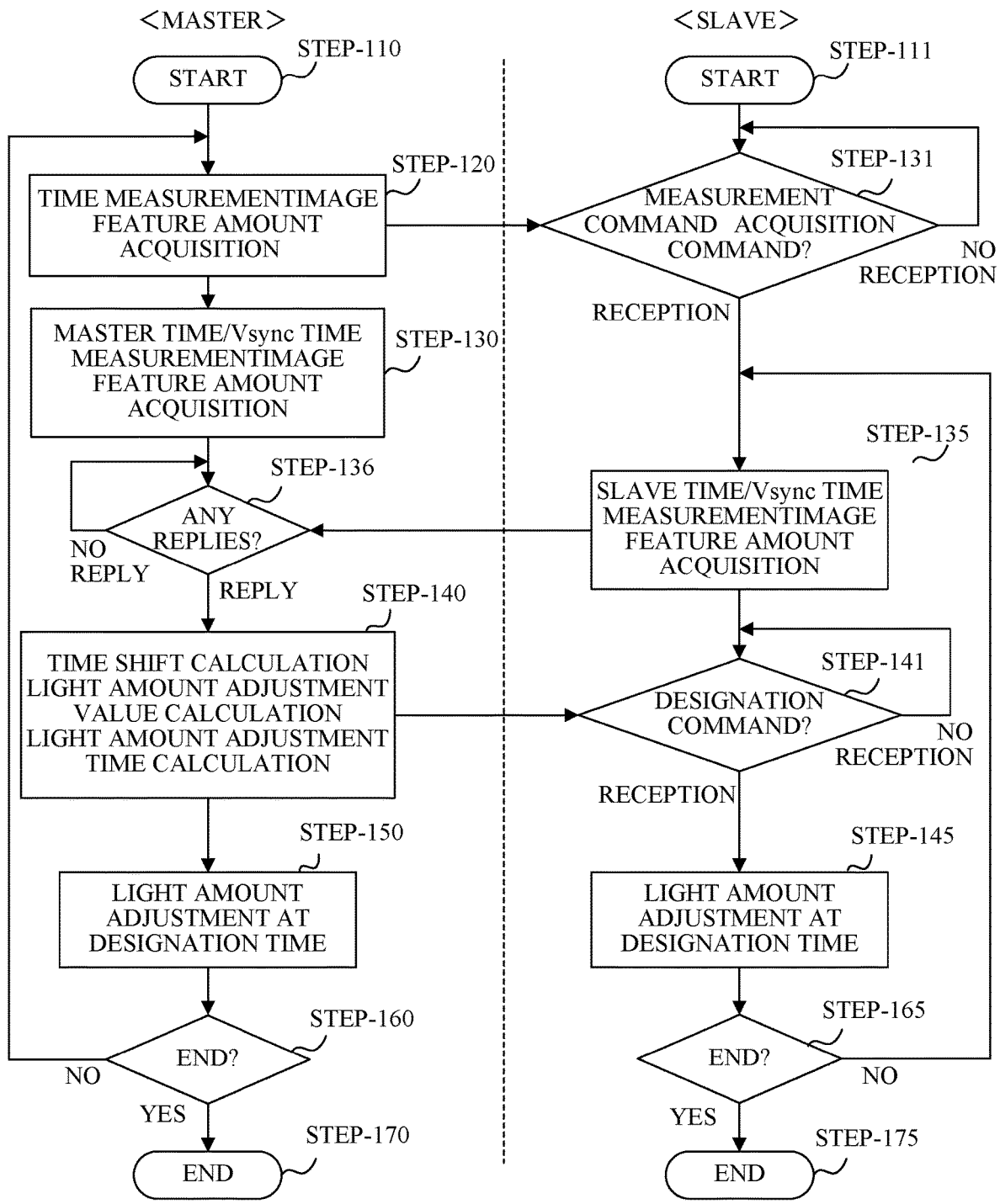
FIG. 8 is a flowchart of processing performed by a master projector and a slave projector according to a fourth embodiment of the present invention.

A flowchart in FIG. 8 illustrates the processing performed by the master projector 100 and the slave projectors 100a and 100b. The following description omits the symbols of the master and slave projectors.

The master projector (controller 210) receives the contrast synchronization adjustment command transmitted by the user through the PC 30 in the Step-110. The contrast synchronization adjustment command is a command for causing the master and slave projectors to adjust the contrast ratio of the projection image. In the Step-111, the slave projector starts processing.

The master projector (command controller 220) having received the contrast synchronization adjustment command generates a time measurement command and an image feature amount acquisition command in the Step-120. Then, the master projector transmits a time measurement command and an image feature amount acquisition command to these slave projectors in the Step-130. The time measurement command causes the slave projector to measure or acquire the slave time and the Vsync time, similar to the first embodiment. The image feature amount acquisition command is a command for causing the slave projector to acquire the image feature amount of the image signal. In the Step-130, the master projector measures the master time and the Vsync time, and acquires the image feature amount of the image signal input to it.

The slave projector that has received the time measurement command and the image feature acquisition command in the Step-131 measures or acquires the slave time when the time measurement command and the image feature acquisition command are received, and the Vsync time described later, in the Step-135. The slave projector acquires an image feature amount from the image signal input to it.

Figure 9:
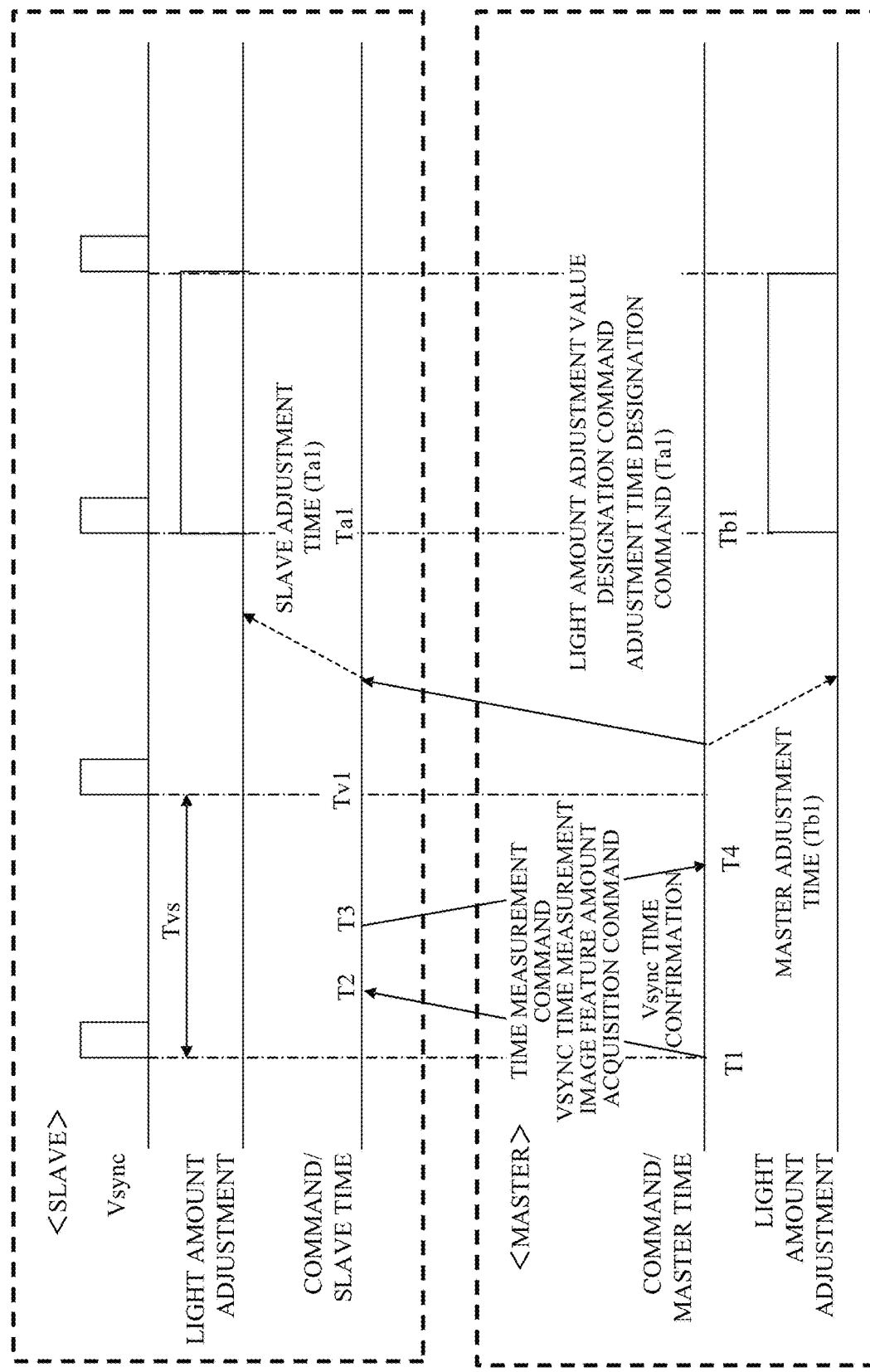
FIG. 9 illustrates a master time, a slave time, and command transmission and reception timings according to the fourth embodiment.

FIG. 9 illustrates an example of the master time, the slave time, and the command transmission and reception timing according to this embodiment. Even in this embodiment, the master projector and the slave projector each have the time unit 260 similar to the first embodiment, and use the standard time set by the specific server or the internally counted internal time as the master time and slave time.

In the Step-130, the master projector measures the command transmission time T1 as the master time when the time measurement command and the image feature amount acquisition command are transmitted to the slave projector. In the Step-135, the slave projector measures the command reception time T2 as the slave time when the time measurement command and the image feature quantity acquisition command are received. The slave projector predicts and acquires the next generation time of the vertical synchronization signal Vsync of the period Tvs as Vsync time Tv1, or measures the generation time of the just previously generated vertical synchronization signal Vsync as the Vsync time Tv1. The master and slave projectors acquire the image feature amount, such as the maximum luminance, the minimum luminance, or the average luminance of the image signal input to each of them, for each frame.

The slave projector collectively sends the obtained T2 and Tv1, the information reply time T3 as the slave time for sending them back to the master projector, and the obtained image feature amount to the master projector as the slave time/feature amount information.

The master projector that has received the slave time/feature information in the Step-136 measures, in the Step-140, information reception time T4 as the master time when the slave time/feature information is received. Then, the shift amount ΔT between the master time and the slave time is calculated using T1, T2, T3, and T4 and the expression (1) described according to the first embodiment.

The master projector calculates at least one of the maximum luminance, the minimum luminance, and the average luminance of all the projection images based on the image feature amount collected from it and the slave projectors. Then, according to the result, the adjustment amount of the light controller 150 or the light source unit 180 of each of the master and slave projectors (referred to as the master light amount adjustment amount and the slave light amount adjustment amount hereinafter) is calculated. The master and slave light amount adjustment amounts are, for example, the adjustment amount for adjusting the diaphragm of the light controller 150 to the open side as the maximum luminance of the image signal is higher, and the adjustment amount of the drive current value for increasing the light emission amount from the light source unit 180.

The master projector calculates slave light amount adjustment time (first operation time) Ta1 as the Vsync time when the slave projector adjusts the light amount among the generation times of the vertical synchronization signals. The master projector calculates master light amount adjustment time (second operation time) Tb1 when the master projector adjusts the light amount in synchronization with Ta1. Ta1 and Tb1 have the following relationship.

Tb1=Ta1−ΔT

When there is a shift in the Vsync time between the two slave projectors, their average time may be calculated, and the average time may be used as the slave light amount adjustment time.

The master projector transmits a light amount adjustment value designation command indicating the slave light amount adjustment value and an imaging time designation command indicating the slave light amount adjustment time Ta1 to the slave projector.

The slave projector that has received the light amount adjustment value designation command and the imaging time designation command in the Step-141 changes the light controller 150 or the light source unit 180 in the Step-145 according to the slave light amount adjustment value at the slave light amount adjustment time Ta1. On the other hand, in the Step-150, the master projector adjusts the light controller 150 or the light source unit 180 at the master light amount adjustment time Tb1 according to the master light amount adjustment amount.

In adjusting the light amount for the next frame, the master projector returns from the Step-160 to the Step-120, and the slave projector returns from the Step-165 to the Step-135. When the light amount is not adjusted for the next frame, this flow ends in the Step-170 and the Step-175, respectively.

Although the master and slave light amount adjustment times are described as Vsync times acquired by the slave projector in this embodiment, the Vsync time acquired by the master projector may be used as the master and slave light amount adjustment times.

This embodiment can adjust the light amounts of these projectors in synchronization with the generation time of the vertical synchronization signal or the like in the slave or master projector, and can increase the contrasts of all projection images almost without the time lags.

Fifth Embodiment

Figure 10:
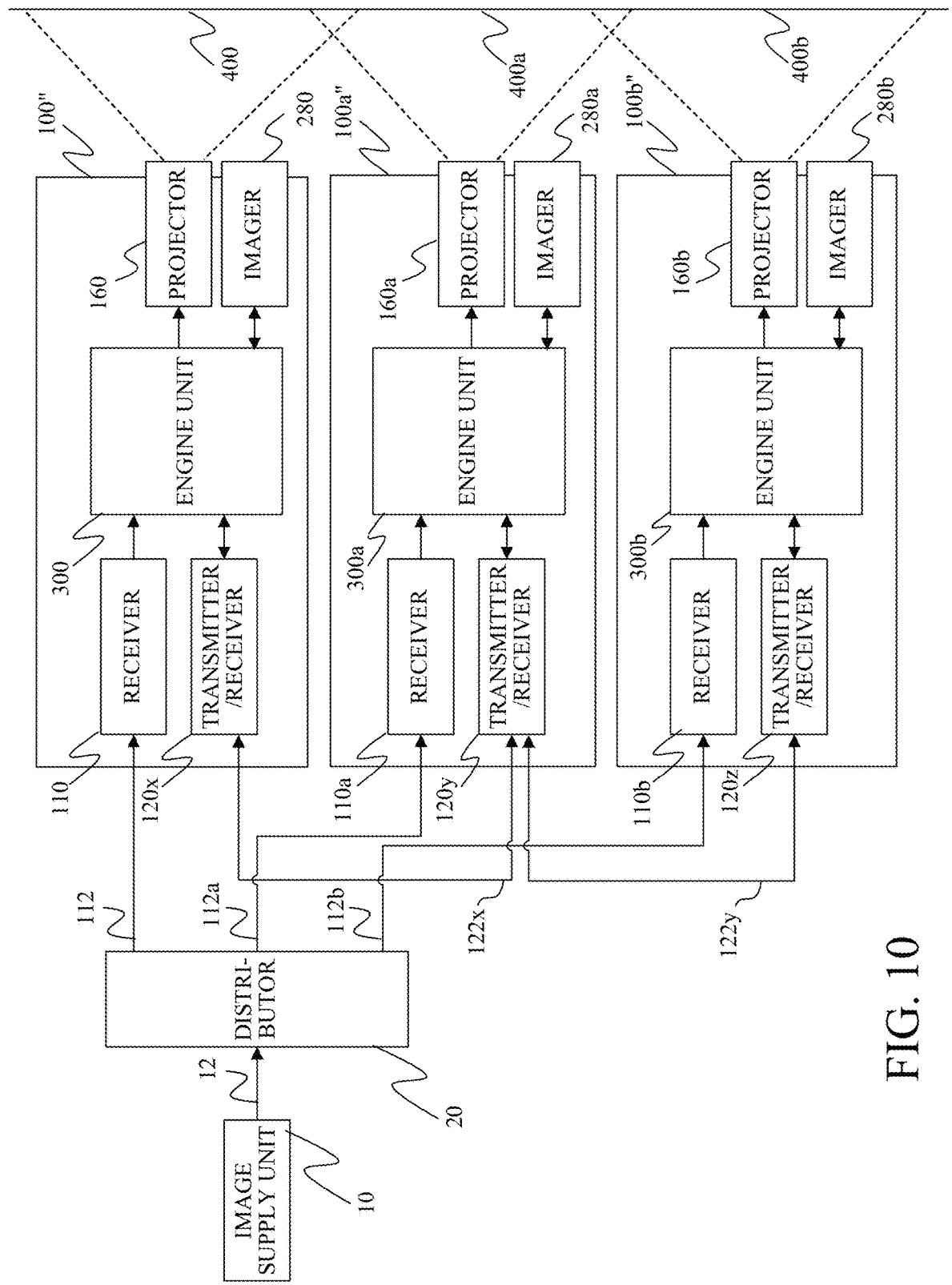
FIG. 10 is a block diagram showing a configuration of a plurality of projectors according to a fifth embodiment of the present invention.

Next follows a description of a fifth embodiment according to the present invention. FIG. 10 illustrates a usage mode in the image projection using a plurality of (totally three) projectors 100", 100a", and 100b". Those elements in FIG. 10, which are corresponding elements in FIGS. 1 and 2, will be designated by the same reference numerals, and a description thereof will be omitted.

The projectors 100", 100a", and 100b" have transmitters/receivers 120x, 120y, and 120z, respectively. The transmitter/receiver 120x is connected to the transmitter/receiver 120y through the cable 122x, and the transmitter/receiver 120y is connected to the transmitter/receiver 120z through the cable 122y. This communication network corresponds, for example, to EtherCAT of an industrial open network. The following description again uses the flowchart in FIG. 8 used for the fourth embodiment.

In the Step-110, the master projector 100" receives the contrast synchronization adjustment command transmitted by the user through an unillustrated PC.

The master projector 100" having received the contrast synchronization adjustment command generates the time measurement command and the image feature amount acquisition command in the Step-120. Then, in the Step-130, the master projector 100" sends the time measurement command and the image feature amount acquisition command through the transmitter/receiver 120x, the cable 122x, and reception unit 120y, to the slave projector 100a". The slave projector 100a" transmits the transmitter/receiver 120y, the cable 122y, and the transmitter/receiver 120z to the slave projector 100b". In the same Step-130, the master projector 100" acquires the image feature amount of the image signal inputted to it as well as measuring the master time and the Vsync time.

The slave projectors 100a" and 100b" having received the time measurement command and the image feature amount acquisition command measure and acquire the slave reception time T2 when both of the above commands are received and the Vsync time Tv1 described in the fourth embodiment in the Step-135. The image feature amount is acquired from the image signal input to it. The slave projectors 100a" and 100b" combine T2 and Tv1, information reply time T3 as the slave time to collectively send them as the slave time/feature amount information back to the master projector, and the acquired image feature amount to the master projector 100. At this time, the slave projector 100a" transmits the slave time/feature amount information to the master projector 100" through the transmitter/receiver 120y, the cable 122x, and the transmitter/receiver 120x. The slave projector 100b" transmits and receives the slave time/feature amount information to the master projector 100" through the transmitter/receiver 120z, the cable 122y, the transmitter/receiver 120y, the cable 122x, and the transmitter/receiver 120x.

In the Step-140, the master projector 100 measures the information reception time T4 as the master time when the slave time/feature amount information is received, and calculates the shift amount ΔT between the master time and the slave time using T1, T2, T3, and T4 and the expression (1) described in the first embodiment.

The master projector 100 obtains at least one of the maximum luminance, the minimum luminance, and the average luminance of all projection images from the image feature amount collected from it and the slave projectors 100a″ and 100b″. Then, the master light amount adjustment amount and the slave light amount adjustment amount are calculated according to the result.

The master projector 100″ calculates the slave light amount adjustment time Ta1 and the master light amount adjustment time Tb1 in synchronization with it. The master projector 100″ sends the light amount adjustment value designation command (slave light amount adjustment value) and the imaging time designation command (slave light amount adjustment time) to the slave projector 100a″ through the transmitter/receiver 120x, the cable 122x, and the transmission unit 120y. The slave projector 100a″ transmits the light amount adjustment value designation command and the imaging time designation command to the slave projector 100b″ through the transmitter/receiver 120y, the cable 122y, and the transmitter 120z.

The slave projectors 100a″ and 100b″ having received the light amount adjustment value designation command and the imaging time designation command adjust, in the Step-145, the light controller 150 or the light source unit 180 illustrated in FIG. 1 at the slave light amount adjustment time Ta1 according to the slave light amount adjustment value. On the other hand, in the Step-150, the master projector 100″ adjusts the light controller 150 or the light source unit 180 at the master light amount adjustment time Tb1 according to the master light amount adjustment amount.

In the communication using the EtherCAT, a command is transmitted from the master to the slave, and the slave that has received the command transmits it to the downstream slave. On the other hand, the most downstream slave that has received the command transmits information corresponding to the command to the next upstream slave, the slave that has received the information transmits the information to the next upstream slave, and finally the information is transmitted to the master. Unlike the Ethernet, this communication method has no handshake between the master and the slave or software protocol processing, and thus allows a higher speed communication. Hence, the communication time between the plurality of projectors can be shortened, and the operations of the plurality of projectors can be easily synchronized with one another.

The communication by the EtherCAT is effective where a plurality of projectors perform image projections and imaging or spectrometric measurements as described in the first and second embodiments.

Sixth Embodiment

Figure 11:
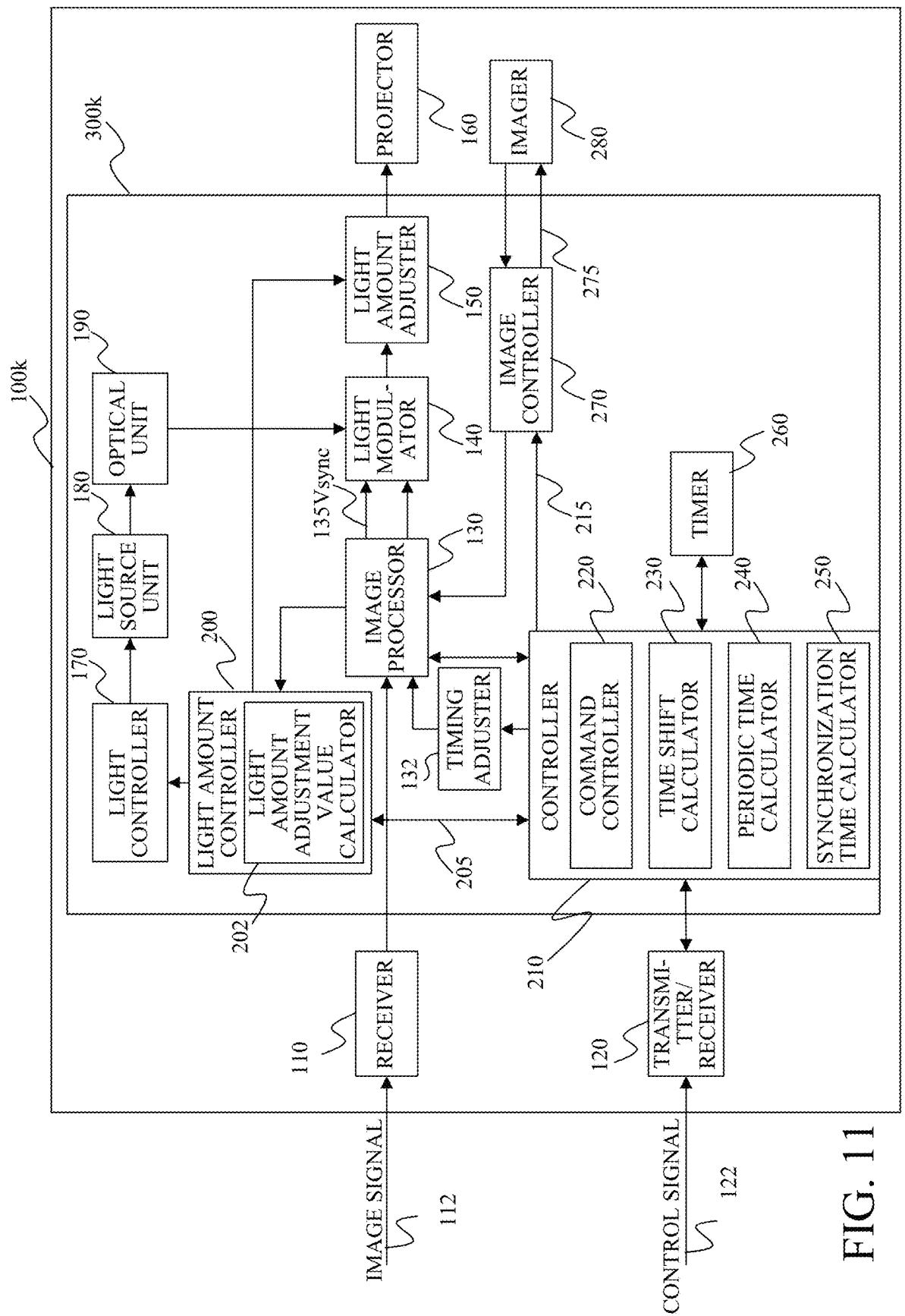
FIG. 11 is a block diagram showing a configuration of a projector according to a sixth embodiment of the present invention.

A sixth embodiment of the present invention will now be described. FIG. 11 illustrates a configuration of a projector 100k according to the sixth embodiment. Those elements in FIG. 6, which are corresponding elements in FIG. 1, will be designated by the same reference numerals, and a description thereof will be omitted.

Figure 12:
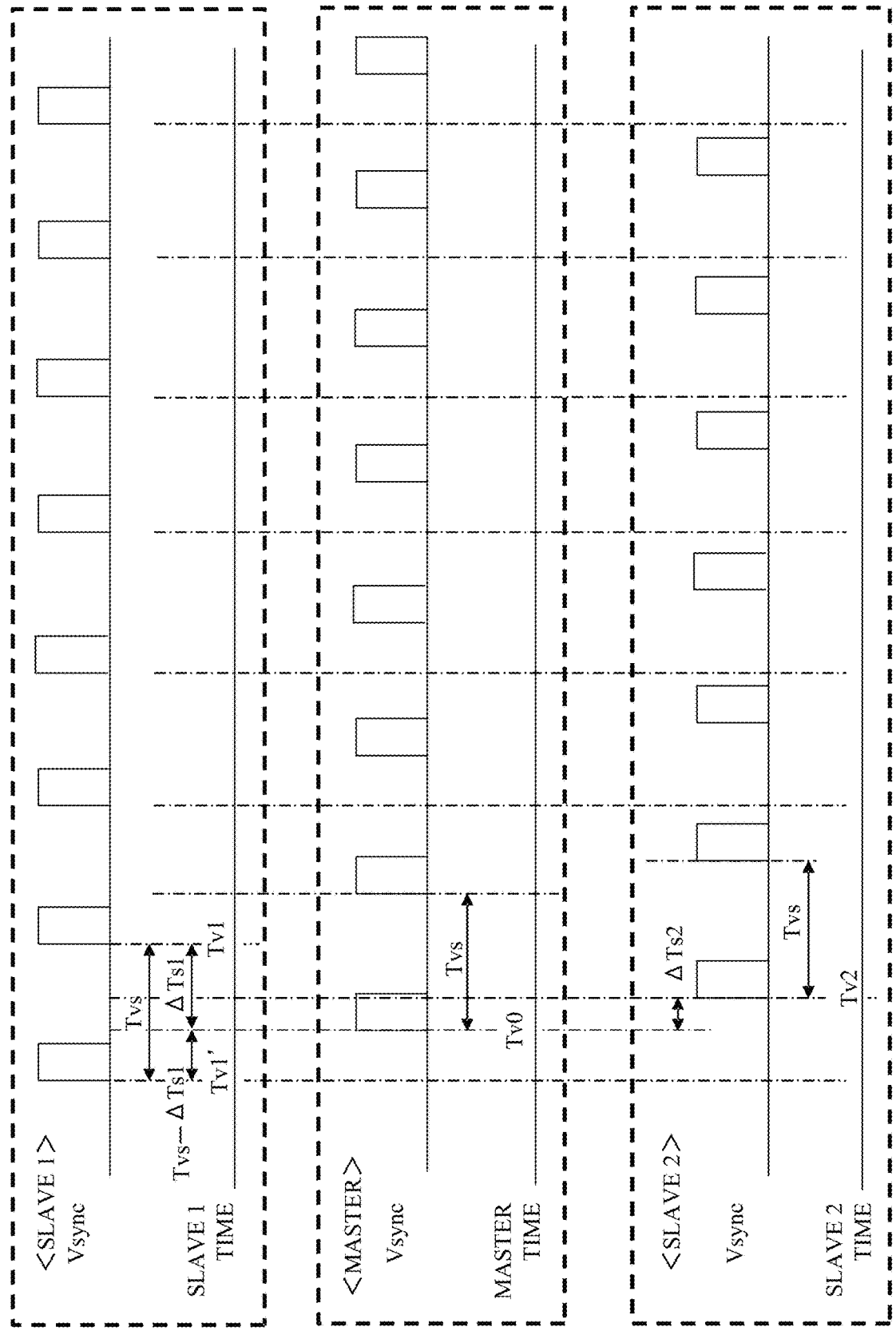
FIG. 12 illustrates a shift among vertical synchronization signals of a plurality of projectors according to the sixth embodiment.

The projector 100k according to this embodiment differs from that of the first embodiment in that the engine unit 300k has a timing adjuster 132. FIG. 12 illustrates the generation time of the vertical synchronization signal Vsync in each of three projectors consisting of the master projector, the slave projector 1, and the slave projector 2. The period of the vertical synchronization signal in any of the projectors is Tvs. The configuration of each of the slave projectors 1 and 2 is the same as that of the projector 100 or the projectors 100a and 100b according to the first embodiment.

Similar to the other embodiments, the master projector and slave projectors 1 and 2 have the standard time set by the specific server or the projector's own internal time as the master time and slave time. The method of calculating or acquiring the shift amount between the master time and the slave time and the Vsync time is the same as that in the other embodiments.

The master projector transmits the time measurement command to the slave projectors 1 and 2. The master projector calculates the shift amount ΔT between the master time and the slave time, using the command transmission time T1 and the information reception time T4 acquired by itself, the command reception time T2, and the information reply time T3 returned from the slave projectors 1 and 2, and the expression (1).

The master projector calculates the Vsync times Tv1 and Tv2 in each of the slave projectors 1 and 2.

The generation times of the vertical synchronization signals Vsync of the slave projects 1 and 2 are delayed by ΔTs1 and ΔTs2 relative to the generation time Tv0 of the vertical synchronization signal Vsync of the master projector. If this delay time is larger than half the period Tvs of the vertical synchronization signal Vsync, it may be determined that the vertical synchronization signal Vsync is faster than that of the master projector. For example, when ΔTs1>Tvs/2, the vertical synchronization signal Vsync of the slave projector 1 is faster than the vertical synchronization signal Vsync of the master projector by Tvs−ΔTs1, and the Vsync time becomes Tv1′.

In order to make the timings (or image projection timings) of the vertical synchronization signals Vsync of a plurality of projectors coincide with each other, the other vertical synchronization signals Vsync are made to coincide with the most delayed vertical synchronization signal Vsync. In FIG. 12, the slave projector 2 has the most delayed vertical synchronization signal Vsync. In this case, the timings of the vertical synchronization signals Vsync for the master projector and the slave projector 1 are made to coincide with the timing of the vertical apparatus signal Vsync of the slave projector 2.

More specifically, the timing of the vertical synchronization signal Vsync is delayed by ΔTs2 in the master projector, and the timing of the vertical synchronization signal Vsync in the slave projector 1 is delayed by Tvs−ΔTs1+ΔTs2. The timing of the vertical synchronization signal Vsync in each projector is controlled by the above timing adjuster (time acquirer and timing controller) 132 described above.

If the image signal has a frame rate of 60 Hz, then Tvs=16.66 ms. If it is assumed that the internal time of each projector has a resolution of 1 ms, the slave projectors 1 and 2 adjust Vsync times Tv1 and Tv2 with an accuracy of about 1 ms. In order to equalize the timings of the vertical synchronization signals Vsync more accurately, the time unit 260 in each projector may be a counter operating with a resolution of 1 ms or less.

Each projector may be communicable through the LAN using the Ethernet, or may be communicable through the EtherCAT.

Since the timings of the vertical synchronization signals among the plurality of projectors can be made to coincide with each other, this embodiment can project images at synchronized timings among the plurality of projectors.

This embodiment can perform a plurality of adjustment operations for the image projection at the synchronized timings by this and other image projection apparatuses. The present invention can synchronize the image projection timings of this and other image projection apparatuses with each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-108164, filed on Jun. 5, 2018, which is hereby incorporated by reference herein in its entirety.

What is claimed is:

1. An image projection apparatus communicable with another image projection apparatus and having a first internal time, the image projection apparatus comprising:
a time acquirer configured to acquire information of a second internal time included in the other image projection apparatus through a communication; and
a controller configured to calculate a difference between the first internal time and the second internal time and to set, using the difference, an operation time for implementing a first operation and a second operation for an adjustment relating to an image projection by the image projection apparatus and the other image projection apparatus.

2. The image projection apparatus according to claim 1, wherein the other image projection apparatus updates a projection image whenever a timing signal having a predetermined period is generated, and the operation time is a generation time of the timing signal.

3. The image projection apparatus according to claim 1, wherein the first operation is the image projection by one of the image projection apparatus and the other image projection apparatus, and the second operation is imaging of the projection image from the one image projection apparatus by an imager.

4. The image projection apparatus according to claim 1, wherein the first operation is the image projection by one of the image projection apparatus and the other image projection apparatus, and the second operation is a spectral measurement of image projection light from the one image projection apparatus by a spectrometer.

5. The image projection apparatus according to claim 3, wherein the one image projection apparatus sequentially updates the projection image by driving a light modulation element configured to modulate light from a light source according to an input image signal, using a line sequential drive scanning method or a surface sequential drive scanning method for each generation of a timing signal having a predetermined period, and
wherein the operation time of the first operation is a generation time of the timing signal, and the operation time of the second operation is a time when each update of the projection image is completed.

6. The image projection apparatus according to claim 3, wherein the controller adjusts a luminance or a color of the projection image from at least one of the image projection apparatus and the other image projection apparatus, using a result obtained by the second operation.

7. The image projection apparatus according to claim 1, wherein each of the image projection apparatus and the other image projection apparatus includes a feature amount acquirer configured to perform the image projection according to an image signal and to acquire a feature amount of the image signal, and
wherein each of the first operation and the second operation is an operation configured to adjust, according to the feature amount, a light amount of image projection light or a color of the projection image in the image projection apparatus and the other image projection apparatus.

8. A method of controlling an image projection apparatus communicable with another image projection apparatus and having a first internal time, the method comprising the steps of:
acquiring information of a second internal time included in the other image projection apparatus through a communication; and
calculating a difference between the first internal time and the second internal time and to set, using the difference, an operation time for implementing a first operation and a second operation for an adjustment relating to an image projection by the image projection apparatus and the other image projection apparatus.

9. An image projection apparatus communicable with another image projection apparatus and having a first internal time, the image projection apparatus comprising:
a time acquirer configured to acquire information of a second internal time included in the other image projection apparatus through a communication; and
a timing controller configured to calculate a difference between the first internal time and the second internal time and to perform, using the difference, an operation such that the image projection apparatus and the other image projection apparatus have synchronized image projection timings.

10. A method of controlling an image projection apparatus communicable with another image projection apparatus and has a first internal time, the method comprising the steps of:

acquiring information of a second internal time included in the other image projection apparatus through a communication; and calculating a difference between the first internal time and the second internal time and to perform, using the difference, an operation such that the image projection apparatus and the other image projection apparatus have synchronized image projection timings.

11. A non-transitory computer-readable storage medium storing a computer program for causing a computer of an image projection apparatus communicable with another image projection apparatus and having a first internal time, to execute processing according to a control method, wherein the control method comprises the steps of:

acquiring information of a second internal time included in the other image projection apparatus through a communication; and calculating a difference between the first internal time and the second internal time and to set, using the difference, an operation time for implementing a first operation and a second operation for an adjustment relating to an image projection by the image projection apparatus and the other image projection apparatus.

12. A non-transitory computer-readable storage medium storing a computer program for causing a computer of an image projection apparatus communicable with another image projection apparatus and having a first internal time, to execute processing according to a control method, wherein the control method comprises the steps of:

acquiring information of a second internal time included in the other image projection apparatus through a communication; and calculating a difference between the first internal time and the second internal time and to perform, using the difference, an operation such that the image projection apparatus and the other image projection apparatus have synchronized image projection timings.

* * * * *